UNITED STATES PATENT OFFICE 2,239,864

PROCESS FOR PRODUCING ETHYNYL CYCLOPENTANOPOLYHYDROPHENANTHRENE COMPOUNDS

Homer E. Stavely, Highland Park, N. J., assignor to E. R. Squibb & Sons, New York, N. Y., a corporation of New York No Drawing. Application September 8, 1938,
Serial No. 228,957

6 Claims. (Cl. 260—397)

This invention relates to the production of ethynyl-substituted cyclopentanopolyhydrophenanthrenes, especially 17-ethynyl-androstenediol-3,17, a compound important as a possible precursor of hormones of the pregnane series and compounds similar to the supra-renal cortex hormones.

In the following description and claims, the nomenclature and numbering system employed is that established by the American Chemical Society monograph "Chemistry of Natural Products Related to Phenanthrene" by L. F. Fieser, published in 1936 by Reinhold Publishing Corporation, New York city.

17-ethynyl-androstenediol-3,17

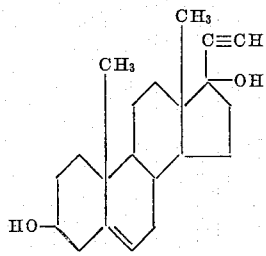

has been priorly prepared by adding a dry ether solution of dehydroisoandrosterone

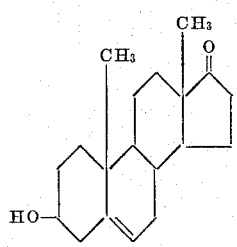

to potassium acetylide (KC≡CH) in liquid ammonia [Helv. Chim. Acta 30, 1280, (1937); Naturwissenschaften 25, 682, (1937)]. This process, however, is inefficient and complicated, requiring the use of cooling baths (for the liquid ammonia) and necessitating separation of unreacted dehydroisoandrosterone with Girard's ketone reagent.

It is the object of this invention to provide a simple and efficient process of preparing ethynyl-substituted cyclopentanopolyhydrophenanthrenes, especially 17-ethynyl-androstenediol-3,17.

In the practice of this invention, a cyclopentanopolyhydrophenanthrene having a nuclear keto group

(e. g. a keto group in the 17-position) is converted into the corresponding ethynyl-hydroxy compound

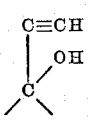

by reaction with acetylene in the presence of a tertiary alcoholate, such as potassium tertiary-amylate or potassium tertiary-butylate, preferably in a dry ether medium. This process, as contrasted with the above-noted prior process, requires no temperature control or ketone-separating reagent, and is singularly efficient from the standpoint of both yield and reaction time.

The following example is illustrative of the invention: 50 cc. absolute ether is placed in a round-bottom flask provided with a stirrer and mercury seal, and pure dried acetylene is bubbled therethrough for a half hour at room temperature. Then, while continuing the acetylene addition and stirring, a solution of 1 g. potassium metal in 15 cc. dry tertiary-amyl alcohol and a solution of 1 g. dehydroisoandrosterone in 50 cc. dry ether are added dropwise over a half hour period, and the acetylene addition and stirring are continued for five hours longer. The reaction mixture is then acidified with a concentrated ammonium chloride solution, the ether layer separated, and the aqueous layer thoroughly extracted with ether; the combined ether solutions are washed and dried, and the product, 17-ethynyl-androstenediol-3,17, is obtained by evaporating the ether and recrystallizing from aqueous methanol. The yield is 85% of the theoretical.

The invention may be variously otherwise embodied within the scope of the appended claims.

I claim:

1. The process of preparing an ethynyl-substituted cyclopentanopolyhydrophenanthrene which comprises reacting a cyclopentanopolyhydrophenanthrene having a keto group in the 17- position with acetylene in the presence of an alkali-metal tertiary alcoholate.

2. The process of preparing an ethynyl-substituted cyclopentanopolyhydrophenanthrene which comprises reacting a cyclopentenopolyhydrophenanthrene having a keto group in the 17-position with acetylene in the presence of a member of the group consisting of potassium tertiary-amylate and potassium tertiary-butylate.

3. The process of preparing an ethynyl substituted cyclopentanopolyhydrophenanthrene which comprises reacting a cyclopentenopolyhydrophenanthrene having a keto group in the 17-position with acetylene in dry ether and in the presence of a member of the group consisting of potassium tertiary-amylate and potassium tertiary-butylate.

4. The process of preparing 17-ethynyl-androstenediol-3,17 which comprises reacting dehydroisoandrosterone with acetylene in the presence of an alkali-metal tertiary alcoholate.

5. The process of preparing 17-ethynyl-androstenediol-3,17 which comprises reacting dehydroisoandrosterone with acetylene in the presence of a member of the group consisting of potassium tertiary-amylate and potassium tertiary-butylate.

6. The process of preparing 17-ethynyl-androstenediol-3,17 which comprises reacting dehydroisoandrosterone with acetylene in dry ether and in the presence of potassium tertiary-amylate.

HOMER E. STAVELY.